United States Patent
Ueki et al.

(10) Patent No.: US 9,608,726 B2
(45) Date of Patent: Mar. 28, 2017

(54) DISPLAY DEVICE

(71) Applicant: PANASONIC CORPORATION, Osaka (JP)

(72) Inventors: Akihiro Ueki, Osaka (JP); Toshiyuki Maeda, Hyogo (JP); Takashi Suzuki, Osaka (JP); Akira Shiokawa, Osaka (JP); Koji Aoto, Hyogo (JP); Koji Nakanishi, Osaka (JP); Hideki Aoyama, Osaka (JP); Mitsuaki Oshima, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 63 days.

(21) Appl. No.: 14/677,847

(22) Filed: Apr. 2, 2015

(65) Prior Publication Data
US 2015/0222355 A1    Aug. 6, 2015

Related U.S. Application Data

(63) Continuation of application No. PCT/JP2014/003630, filed on Jul. 9, 2014.

(30) Foreign Application Priority Data

Sep. 4, 2013 (JP) ................. 2013-182714

(51) Int. Cl.
*H04B 10/116* (2013.01)
*G09G 3/00* (2006.01)
*G09G 3/34* (2006.01)

(52) U.S. Cl.
CPC .......... *H04B 10/116* (2013.01); *G09G 3/003* (2013.01); *G09G 3/3406* (2013.01); *G09G 2310/04* (2013.01); *G09G 2320/10* (2013.01)

(58) Field of Classification Search
CPC .... H04B 10/116; G09G 3/3406; G09G 3/003; G09G 2320/10; G09G 2310/04
See application file for complete search history.

(56) References Cited

U.S. PATENT DOCUMENTS 7,570,246 B2    8/2009    Maniam et al.
7,830,357 B2    11/2010   Kitaoka et al.
(Continued)

FOREIGN PATENT DOCUMENTS

JP    2007-043706 A    2/2007
JP    2007-096547 A    4/2007
(Continued)

OTHER PUBLICATIONS

International Search Report issued in International Application No. PCT/JP2014/003630 dated Sep. 16, 2014, with English translation.

(Continued)

*Primary Examiner* — Aneeta Yodichkas
(74) *Attorney, Agent, or Firm* — McDermott Will & Emery LLP

(57) ABSTRACT

A display device according to the present disclosure includes: a backlight control unit configured to divide the luminescence surface of the backlight into a plurality of areas, and, based on the image signal, (i) perform luminescence control in each of the plurality of areas and (ii) set off periods starting at different times for the plurality of areas. The backlight control unit performs luminescence control in a visible light communication area which is at least one area among the plurality of areas in a period in which the visible light communication signal is output, based on the visible light communication signal, instead of performing luminescence control based on the image signal, and performs the luminescence control based on the image signal, in the (Continued)

visible light communication area, in a period in which the visible light communication signal is not output.

11 Claims, 9 Drawing Sheets

(56) References Cited

U.S. PATENT DOCUMENTS

| | | | |
|---|---|---|---|
| 7,948,469 | B2 | 5/2011 | Kitaoka et al. |
| 2007/0024571 | A1 | 2/2007 | Maniam et al. |
| 2009/0002265 | A1 | 1/2009 | Kitaoka et al. |
| 2010/0302268 | A1 | 12/2010 | Jun et al. |
| 2011/0014955 | A1* | 1/2011 | Kim .................. G02F 1/133603 455/566 |
| 2011/0018911 | A1 | 1/2011 | Kitaoka et al. |
| 2011/0037790 | A1 | 2/2011 | Onishi |
| 2011/0063510 | A1 | 3/2011 | Lee et al. |
| 2011/0216049 | A1 | 9/2011 | Jun et al. |
| 2012/0087676 | A1* | 4/2012 | Lim .................... H04B 10/116 398/182 |
| 2013/0027423 | A1* | 1/2013 | Bae ..................... G09G 3/3413 345/619 |
| 2013/0208027 | A1* | 8/2013 | Bae ..................... G09G 3/3406 345/690 |
| 2014/0023378 | A1 | 1/2014 | Bae et al. |

FOREIGN PATENT DOCUMENTS

| | | |
|---|---|---|
| JP | 2007-183461 A | 7/2007 |
| JP | 2007-295442 A | 11/2007 |
| JP | 2009-212768 A | 9/2009 |
| JP | 2013-128206 A | 6/2013 |
| KR | 2013-0013720 A | 2/2013 |
| WO | 2006/011515 A1 | 2/2006 |
| WO | 2010/098020 A1 | 9/2010 |

OTHER PUBLICATIONS

Extended European Search Report issued in Application No. 14842457.5 dated Aug. 10, 2016.

* cited by examiner (a) Visible light communication signal
(b) Backlight control signal A
(c) Backlight control signal B
(d) Backlight control signal C
(e) Backlight control signal D (b) Backlight control signal A
(c) Backlight control signal B
(d) Backlight control signal C
(e) Backlight control signal D

DISPLAY DEVICE

CROSS REFERENCE TO RELATED APPLICATIONS

This is a continuation application of PCT International Application No. PCT/JP2014/003630 filed on Jul. 9, 2014, designating the United States of America, which is based on and claims priority of Japanese Patent Application No. 2013-182714 filed on Sep. 4, 2013. The entire disclosures of the above-identified applications, including the specifications, drawings and claims are incorporated herein by reference in their entirety.

FIELD

The present disclosure relates to a display device capable of outputting a visible light communication signal.

BACKGROUND

Patent Literatures 1 and 2 each disclose a technique for communication using visible light. Patent Literatures 1 and 2 each disclose a communication technique used by a video display device such as a display and a projector when superimposing communication information in the form of visible light onto a normal video to be displayed, and displaying the video with the communication information.

CITATION LIST

Patent Literature

[PTL 1]
Japanese Unexamined Patent Application Publication No. 2007-43706
[PTL 2]
Japanese Unexamined Patent Application Publication No. 2009-212768

SUMMARY

Technical Problem

The present disclosure provides a display device capable of outputting visible light communication signals without significantly damaging the image quality of images to be displayed and reducing reception errors of the output visible light communication signals.

Solution to Problem

A display device according to an aspect of the present disclosure is a display device which outputs a visible light communication signal, and includes: a display panel including a display screen on which an image is displayed; a display control unit configured to cause the display panel to display the image on the display screen of the display panel, based on an image signal; a backlight having a luminescence surface which illuminates the display screen of the display panel from behind the display screen; and a backlight control unit configured to divide the luminescence surface of the backlight into a plurality of areas, and, based on the image signal, (i) perform luminescence control in each of the plurality of areas and (ii) set off periods starting at different times for the plurality of areas, wherein the backlight control unit is configured to: perform luminescence control in a visible light communication area which is at least one area among the plurality of areas in a period in which the visible light communication signal is output, based on the visible light communication signal, instead of performing luminescence control based on the image signal; and perform the luminescence control based on the image signal, in the visible light communication area, in a period in which the visible light communication signal is not output.

Advantageous Effects

The display device in the present disclosure is capable of outputting visible light communication signals without significantly damaging the image quality of images to be displayed, and reducing reception errors of the output visible light communication signals.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENT

Figure 1:
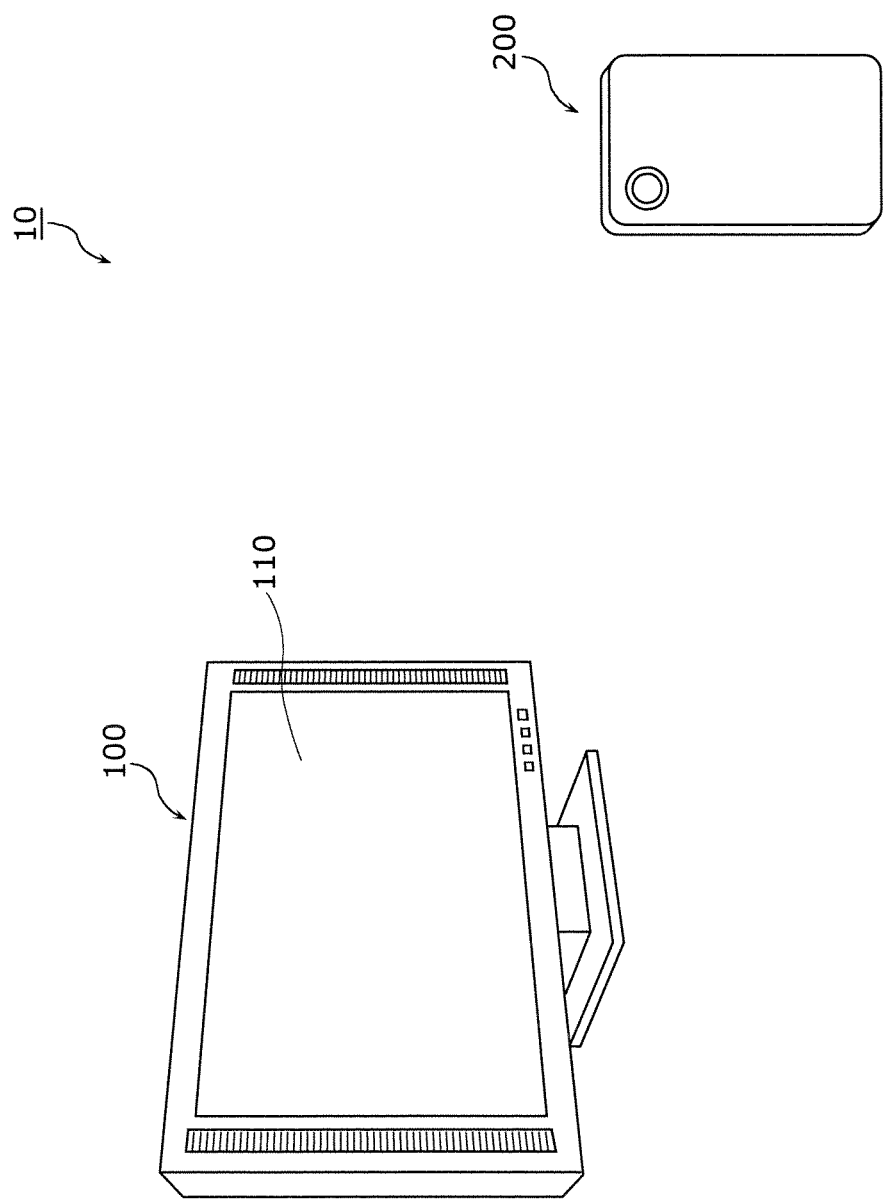
FIG. 1 is a schematic diagram illustrating an example of a visible light communication system according to an embodiment.

Underlying Knowledge Forming Basis of the Present Disclosure

In the field of display devices in recent years, in particular to liquid crystal displays, projectors using liquid crystals, etc., a technique called backlight scan is employed to enhance image quality. Here, backlight scan is a backlight control method for accelerating responses of liquid crystals and preventing video blur by holding. Backlight scan is performed by dividing a display screen into several areas (backlight areas), and controlling luminescence of a backlight so that the respective areas turn on periodically and sequentially. More specifically, backlight scan is a control method for varying periodical times for preset backlight turn-off periods (blanking periods) between the backlight areas. In most cases, the times for blanking periods are generally controlled according to times for scanning on liquid crystals.

However, as disclosed in Patent Literature 1, visible light communication employs a method for superimposing a visible light communication signal by turning on and off a backlight. For this reason, it is impossible to transmit a visible light communication signal during a backlight off period. In addition, in order to prevent such an off period from causing a signal communication error, communication needs to be established in a state in which obtainable image quality is low after stopping backlight scan.

In view of this, the present disclosure provides a display device capable of outputting visible light communication signals without significantly damaging the image quality of images to be displayed and reducing reception errors of the output visible light communication signals.

Hereinafter, an embodiment is described in detail referring to the drawings as necessary. It should be noted that unnecessarily detailed descriptions may be omitted below. For example, detailed descriptions about already well-known matters and overlapping descriptions for substantially identical configurations may be omitted. Such descriptions are omitted to prevent the descriptions below from being unnecessarily redundant and help a person skilled in the art to understand the present disclosure easily.

It should be noted that the Applicants provide the attached drawings and descriptions below to allow the person skilled in the art to fully understand the present disclosure, and do not intend to restrict the subject matters of the Claims by the disclosure thereof.

Embodiment

Hereinafter, an embodiment is described with reference to FIGS. 1 to 8.

[1. Configuration]

FIG. 1 is a schematic diagram illustrating an example of a visible light communication system according to an embodiment.

[1.1 Configuration of Visible Light Communication System]

The visible light communication system 10 illustrated in FIG. 1 includes a display device 100 and a smartphone 200.

The display device 100 is, for example, a television receiver, and is capable of displaying a video on a display screen 110. In addition, the display device 100 is also capable of superimposing a visible light communication signal on the display screen 110.

The smartphone 200 is an example of an electronic device which receives a visible light communication signal, and is capable of receiving the visible light communication signal transmitted from the display device 100. In this way, a user of the smartphone 200 can receive, for example, information related to the video displayed on the display device 100.

In this embodiment, the display device 100 is assumed to be a monitor for video display as a non-limiting example. The display device 100 may be a video projecting device such as a projector. In addition, although the smartphone 200 is taken as an example of the electronic device which receives the visible light communication signal output by the display device 100, any other electronic device for receiving a visible light communication signal is possible. For example, the electronic device may be a receiving device conforming to JEITA-CP1222. In addition, the electronic device may be a general mobile terminal other than smartphones. The electronic device may receive a visible light communication signal and decode the received visible light communication signal to obtain the signal information.

An information communication method for transmitting visible light communication signals may conform to JEITA-CP-1223 that is currently being developed to an international standard or IEEE-P802.15 which has already been standardized. In other words, the electronic device may be configured with a receiving device conforming to any of these standards.

[1.2 Configuration of Display Device]

Figure 2:
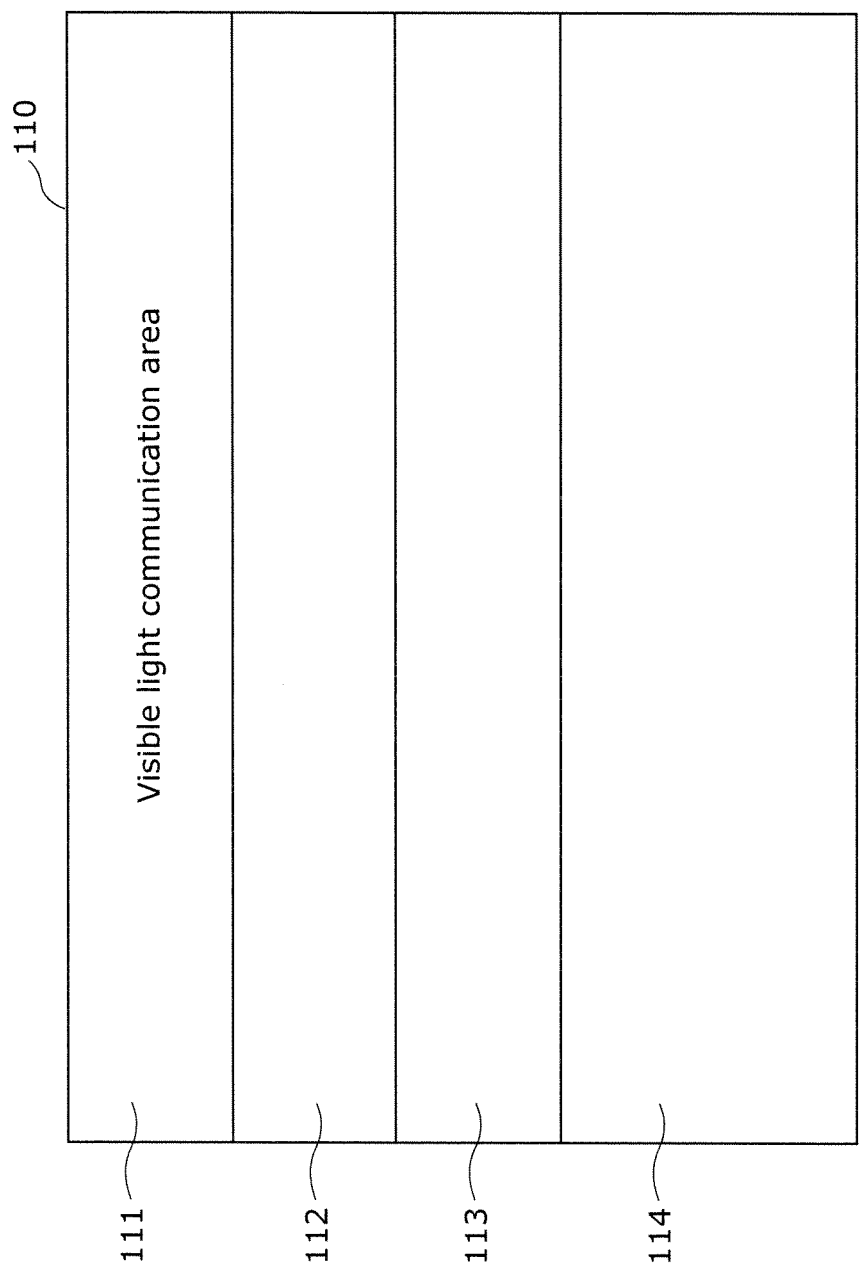
FIG. 2 is a schematic diagram illustrating a display screen of a display device according to the embodiment.

FIG. 2 is a schematic diagram illustrating a display screen of the display device according to this embodiment.

When a video is displayed on the display screen 110 of the display device 100 illustrated in FIG. 2, luminescence of the backlight is controlled for each of areas by backlight scan. FIG. 2 illustrates an example where the display screen 110 is divided into four areas 111 to 114.

In this embodiment, the area 111 among the four areas is used as an area (visible light communication area) on which emission of light based on the visible light communication is preferentially performed. This is not described here and described in detail later.

Figure 3:
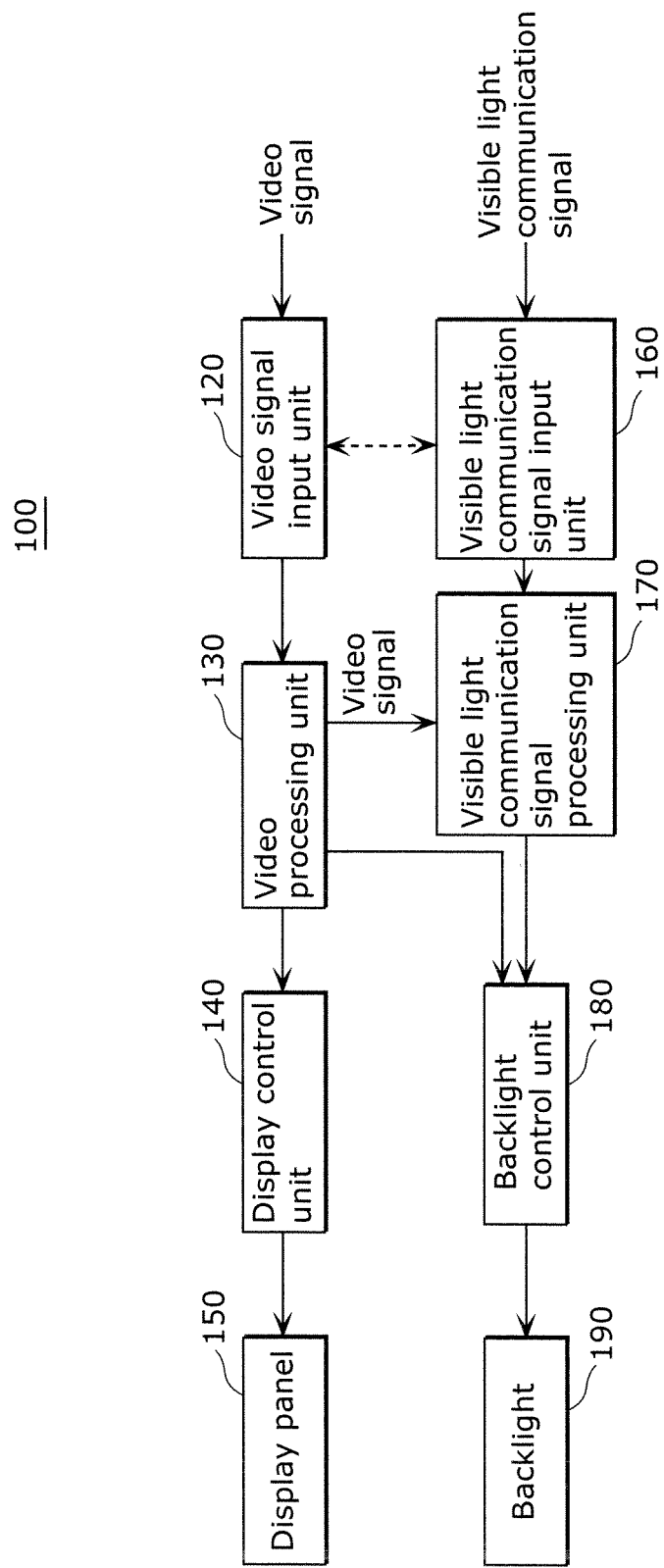
FIG. 3 is a block diagram illustrating an example of a schematic configuration of the display device according to the embodiment.

FIG. 3 is a block diagram illustrating a schematic configuration of the display device according to this embodiment.

The display device 100 illustrated in FIG. 3 is capable of outputting a visible light communication signal, and includes: a video signal input unit 120; a video processing unit 130; a display control unit 140; a display panel 150; a visible light communication signal input unit 160; a visible light communication signal processing unit 170; a backlight control unit 180; and a backlight 190.

The video signal input unit 120 receives a video signal related to the video displayed on the display panel 150. The video signal input unit 120 transmits the input video signal to the video processing unit 130.

The video processing unit 130 performs general image processing such as processing for enhancing an image quality on the video signal. The video processing unit 130 transmits the video signal on which the image processing has been performed to the display control unit 140 and the visible light communication signal processing unit 170. Here, the video signal includes information related to brightness etc. of the video.

The display panel 150 is, for example, a liquid crystal panel, and includes the display screen 110 for video display.

The display control unit 140 controls the display panel 150 so that the video is displayed on the display screen 110 of the display panel 150, based on the video signal. In this embodiment, the display control unit 140 controls the display panel 150 so that the video is displayed on the display panel 150, based on the video signal transmitted from the video processing unit 130. More specifically, the display control unit 140 performs opening control etc. for the liquid crystals of the display panel 150, based on the video signal transmitted from the video processing unit 130. In addition, the display control unit 140 controls the display panel 150 so that the video is displayed on areas of the display screen 110 which correspond to (i) the visible light communication area and (ii) the other areas, based on the video signal transmitted from the video processing unit 130.

The visible light communication signal input unit 160 receives a signal for use in visible light communication (hereinafter referred to as a visible light communication signal). The visible light communication signal input unit 160 transmits the input visible light communication signal to the visible light communication signal processing unit 170.

The visible light communication signal processing unit 170 performs processing such as coding and duty ratio control on the received visible light communication signal. The visible light communication signal processing unit 170 receives a video signal from the video processing unit 130. The visible light communication signal processing unit 170 determines which one of the areas of the display screen 110 illustrated in FIG. 2 is used as the visible light communication area, based on the information related to the brightness etc. of the video represented by the video signal. In other words, the visible light communication signal processing unit 170 determines at least one of the areas as the visible light communication area. Here, for example, the visible light communication signal processing unit 170 may set, as the visible light communication area, an area for displaying a brightest video on the display screen 110, or may set, as the visible light communication area, an area including an end part of the display screen 110 from among the areas on the display screen 110.

The visible light communication signal processing unit 170 transmits the coded visible light communication signal, the information related to the visible light communication area, and the video signal to the backlight control unit 180.

When the position of the visible light communication area is determined in advance, the visible light communication signal processing unit 170 does not need to perform processing related to determination of the visible light communication area. In this case, the video signal may be transmitted directly from the video processing unit 130 to the backlight control unit 180.

The backlight control unit 180 divides the luminescence surface of the backlight 190 into a plurality of areas, performs luminescence control for each of the areas, based on a video signal, and performs control for providing off periods at different times for the areas on the luminescence surface. In a period in which the display device 100 outputs a visible light communication signal, the backlight control unit 180 performs luminescence control based on a visible light communication signal instead of performing luminescence control based on a video signal in the at least one visible light communication area among the areas on the luminescence surface. In a period in which the display device 100 does not output any visible light communication signal, the backlight control unit 180 performs luminescence control based on a video signal in the visible light communication area. Here, for example, in the period in which a visible light communication signal is output, the backlight control unit 180 may perform luminescence control based on the visible light communication signal, determining, as the visible light communication area, the at least one area (at least one area on the luminescence surface of the backlight 190) corresponding to an end part of the display screen 110 among the areas.

In this embodiment, the backlight control unit 180 controls luminance of or a time for the backlight 190 by a backlight control signal transmitted from the video processing unit 130 or the visible light communication signal processing unit 170. The backlight control unit 180 controls luminescence of the backlight 190, based on the visible light communication signal transmitted from the visible light communication signal processing unit 170.

The backlight 190 emits light from behind the display panel 150. More specifically, the backlight 190 includes a luminescence surface for illuminating the display screen 110 of the display panel 150 through a rear surface of the display screen 110. In this way, a viewer can visually recognize the video displayed on the display panel 150.

The luminescence surface of the backlight 190 is divided into areas, and it is possible to perform backlight scan by sequentially performing luminescence control for the respective areas. In this embodiment, the areas on the luminescence surface respectively correspond to areas on the display screen 110. In other words, at least one of the areas on the luminescence surface is used as the visible light communication area. In the visible light communication area, light is emitted based on the visible light communication signal, but no light is emitted based on the video signal. In other words, a state in which no visible light communication signal is superimposed on a video signal is created, and thus it is possible to transmit the visible light communication signal without causing a signal loss.

As described above, the display panel 150 displays the video also in the visible light communication area. In the visible light communication area on the display panel 150, no light is emitted based on a video signal, and light is emitted based on the visible light communication signal. In other words, the video displayed in the visible light communication area is illuminated by light based on the visible light communication signal. For this reason, the viewer can visually recognize the video on the whole display screen 110 of the display panel 150.

However, since the video displayed in the visible light communication area is illuminated by the light based on the visible light communication signal and thus the video is not displayed with an appropriate luminance indicated by the video signal, only the visible light communication area may be darker than the other areas.

Thus, when the display panel 150 is a liquid crystal panel, the luminance can be adjusted by controlling openings of the liquid crystals, and thus such a liquid crystal panel may be used. In other words, the display control unit 140 may control the display panel 150 so that the luminance of the visible light communication area is increased from the luminance at the time of input of the video signal. More specifically, in the period in which the display device 100 outputs the visible light communication signal, the display control unit 140 may control the display panel 150 so that the luminance of the area 111 (visible light communication area) of the display screen 110 corresponding to the visible light communication area is increased from the one at the time when the video is displayed based on the video signal.

Here, the ratio between two kinds of strengths of an encoded signal is referred to as a percent modulation. In general, when the percent modulation is 100%, the highest S/N ratio is obtained, but, particularly in the case of visible light communication, there are problems such as a problem that flickering is more noticeable to human. Here, the encoded visible light communication signal is described as a signal that turns ON/OFF with a percent modulation of 100%. However, High/Low modulation that is not the percent modulation of 100% may be used. There is no particular limitation on the relationship between High and Low, and thus it is only necessary that the relationship of High>Low is satisfied. For example, 100%/10%, 80%/30%, etc. are possible. The following descriptions may be read by replacing ON/OFF (turn-on/turn-off) with High/Low or the like. In addition, the duty ratio of the visible light communication signal is simply treated as a value indicating an ON (turn-on) period normalized for the whole signal transmission period. However, the duty ratio can be read corresponding to (High level×High period+Low level×Low period)/(Signal transmission period×High level).

[2. Operation of Display Device]

Next, a description is given of control performed on the backlight 190 of the display device 100 configured as described above.

[2.1 Comparison Example]

Figure 4:
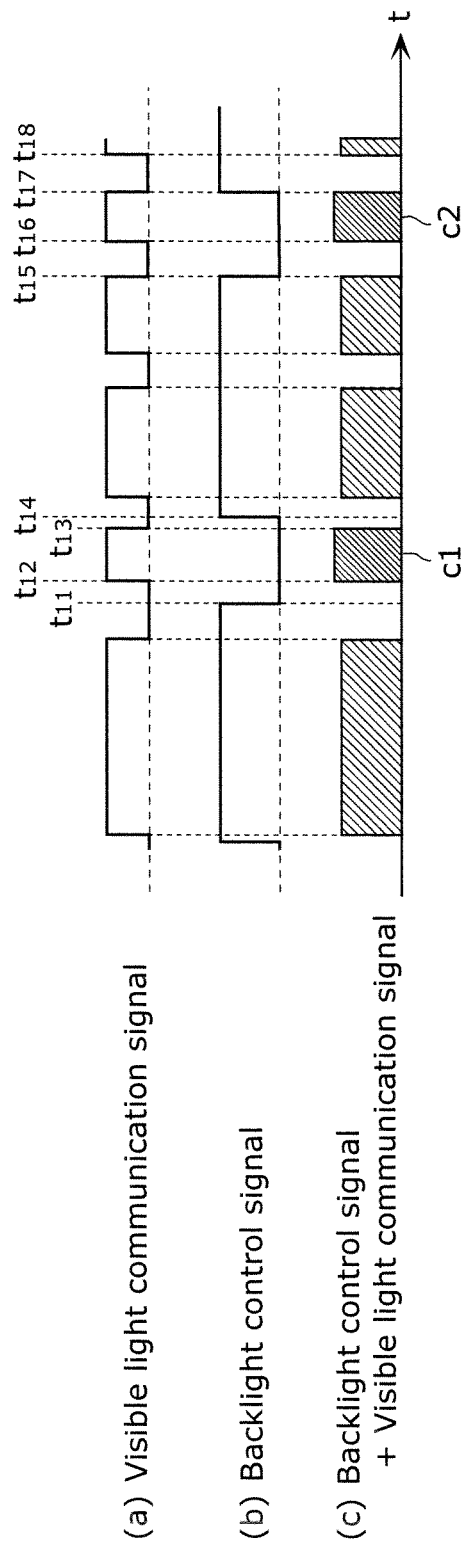
FIG. 4 is a schematic diagram of an example in a state in which a visible light communication signal is superimposed on a backlight signal for displaying a video.

FIG. 4 is a schematic diagram of an example in a state where a visible light communication signal is superimposed on a backlight signal for displaying a video. In FIG. 4, (a) illustrates an example of a visible light communication signal conforming to JEITA CP-1222, and (b) illustrates an example of a backlight control signal. In FIG. 4, (c) illustrates a case in which the visible light communication signal in (a) of FIG. 4 is superimposed on the backlight control signal in (b) of FIG. 4.

As illustrated in (c) of FIG. 4, when the visible light communication signal in (a) of FIG. 4 is superimposed on the backlight control signal in (b) of FIG. 4, in a period between Times t11 to t14 and a period between Times t15 to t18 which are periods in which no backlight control signal is transmitted (periods in which the backlight 190 is turned off), the visible light communication signals (a signal c1 and a signal c2 in the diagram) corresponding to the period between Times t11 to t14 and the period between Times t15 to t18 cannot be superimposed on the backlight control signal. For this reason, the signal c1 and the signal c2 among the visible light communication signals are to be lost, producing a risk that the visible light communication cannot be appropriately performed by the display device 100.

[2.2 Backlight Control]

In this embodiment, an area in which visible light communication is preferentially performed (a visible light communication area) is set instead of superimposing a visible light communication signal on the backlight control signal.

Figure 5A:
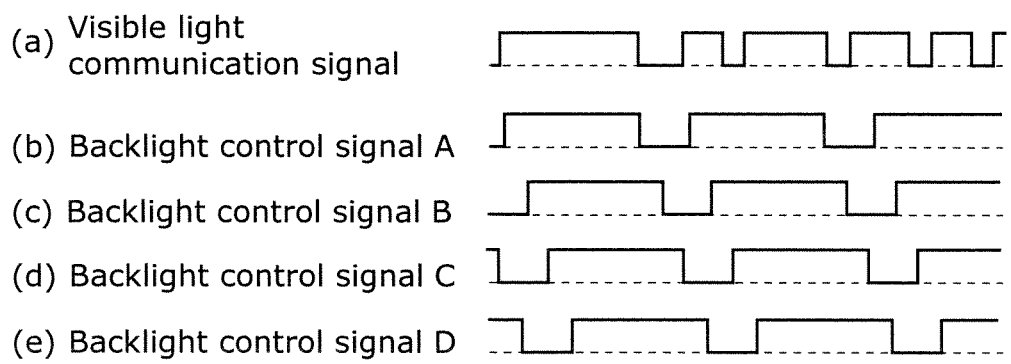
FIG. 5A is a schematic diagram for illustrating signal control according to the embodiment.
Figure 5B:
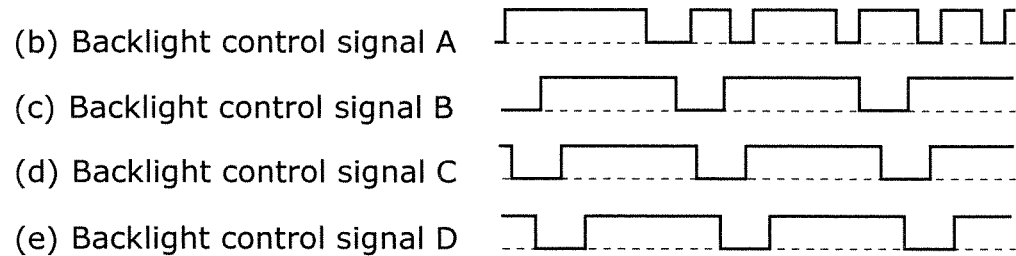
FIG. 5B is a schematic diagram for illustrating signal control according to the embodiment.

FIGS. 5A and 5B each are a schematic diagram for illustrating signal control according to this embodiment.

FIG. 5A illustrates examples of a visible light communication signal and backlight control signals in this embodiment.

In this embodiment, in order to perform backlight scan, the backlight 190 is controlled after being divided into areas corresponding to the four areas 111 to 114 illustrated in FIG. 2. Here, the respective backlight control signals A to D illustrated in FIG. 5A are backlight control signals of areas corresponding to the areas 111 to 114. Accordingly, when no visible light communication signal is received or when the display device 100 does not output a visible light communication signal, the backlight control unit 180 sequentially performs ON/OFF (High/Low) control (luminescence control) on the areas of the backlight 190 at different times, according to the respective backlight control signals A to D.

FIG. 5B illustrates an example of backlight control in this embodiment. More specifically, FIG. 5B illustrates backlight scan in the case where the area corresponding to the area 111 is selected as the visible light communication area.

In this embodiment, as illustrated in FIG. 5B, in the area (visible light communication area) corresponding to the area 111, instead of superimposing the visible light communication signal on the backlight control signal A, only luminescence control on the backlight 190 based on the visible light communication signal is performed and luminescence control on the backlight 190 based on a video signal is not performed. In other words, the backlight control unit 180 controls luminescence of the backlight 190 based only on the visible light communication signal.

On the other hand, in the areas corresponding to the areas 112 to 114, backlight scan is performed using the backlight control signals B to D corresponding to the areas. In other words, the backlight control unit 180 controls luminescence and turn-off of the backlight 190, based on the backlight control signals B to D.

In this way, the display device 100 in this embodiment can preferentially output the visible light communication signal also in a period in which backlight is generally turned off by backlight scan in the area (visible light communication area) corresponding to the area 111. More specifically, the display device 100 in this embodiment, in the period in which the visible light communication signal is transmitted, the backlight 190 is turned on even in the period in which backlight is turned off in the case of general backlight scan, and the backlight 190 is controlled to turn off in the period in which no visible light communication signal is transmitted.

In this embodiment, High and Low of the visible light communication signal correspond to turn-on and turn-off of the backlight 190, the visible light communication signal is directly introduced to a control system (backlight control unit 180) that controls the backlight 190 as illustrated in FIG. 5B.

In this embodiment, the use of a light source using a light emitting diode (LED) as a light source for the backlight 190 makes it possible to accelerate a rise from an ON state to an OFF state.

Alternatively, a conventional cold-cathode tube or the like may be used as a light source for the backlight 190. In this case, since it takes time to transition from an OFF state to an ON state or from an ON state to an OFF state, it is also possible to differentiate High and Low by changing the amount of current that flows in the cold-cathode tube, instead of ON and OFF as in the case of the LED. In addition, since the cold-cathode tube is driven at high frequency, it is also possible to differentiate High and Low by changing the frequency. In the LED, control such as current control may be performed. In this case, it is possible to perform High/Low control instead of ON/OFF control, regarding the High/Low control as control that is a generic concept of the ON/OFF control.

In order to realize such a function, the display device 100 in this embodiment independently includes the visible light communication signal processing unit 170 that generates a modulation signal of the visible light communication signal and the backlight control unit 180 that performs backlight scan control.

[3. Summary]

As described above, in this embodiment, the display device 100 outputs the visible light communication signal, and includes: the display panel 150 including the display screen 110 on which an image is displayed; the display control unit 140 configured to cause the display panel 150 to display the image on the display screen 110 of the display panel 150, based on the image signal; the backlight 190 having the luminescence surface which illuminates the display screen 110 of the display panel 150 from behind the display screen 110; and the backlight control unit 180 configured to divide the luminescence surface of the backlight 190 into a plurality of areas, and, based on the image signal, (i) perform luminescence control in each of the plurality of areas and (ii) set off periods starting at different times for the plurality of areas, wherein the backlight control unit 180 is configured to: perform luminescence control in the visible light communication area which is at least one area among the plurality of areas in a period in which the visible light communication signal is output, based on the visible light communication signal, instead of performing luminescence control based on the image signal; and perform luminescence control based on the image signal, in the visible light communication area, in a period in which the visible light communication signal is not output. In the period in which the display device 100 outputs the visible light communication signal, the backlight control unit 180 is configured to perform the light emission control based on the visible light communication signal instead of performing the light emission control based on the video signal in the at least one visible light communication area among the areas on the light emission surface. In the period in which the display device 100 does not output a visible light communication signal, the backlight control unit 180 is configured to perform the light emission control based on the video signal in the visible light communication area.

In this way, it is possible to provide the display device capable of outputting the visible light communication signal without significantly damaging the image quality of the image(s) to be displayed and preventing (or reducing) a reception error of the output visible light communication signal.

In addition, the display control unit 140 may be configured to cause, based on the image signal, the display panel 150 to display an image on areas which are of the display screen 110 and correspond to (i) the visible light communication area and (ii) one or more areas other than the visible light communication area.

In addition, in the period in which the visible light communication signal is output, the display control unit 140 may be configured to cause the display panel 150 to display an image in an area corresponding to the visible light communication area on the display screen 110, the image having a luminance higher than a luminance resulting when the image is displayed based on the image signal.

With this configuration, it is possible to make the display screen 110 brighter, and to thereby prevent a communication error of the visible light communication signal.

In addition, in the period in which the visible light communication signal is output, the display control unit 140 may be configured to cause the display panel 150 to display an image in an area corresponding to the visible light communication area on the display screen 110, the video image having a luminance lower than a luminance resulting when the video image is displayed based on the video image signal.

With this configuration, when the luminance is low when the duty based on the video signal is lower than the duty of the communication signal, it is possible to make the display screen 110 darker, and to prevent a communication error of the visible light communication signal.

In addition, in the period in which the visible light communication signal is output, the backlight control unit 180 may be configured to perform luminescence control based on the visible light communication signal on at least one area corresponding to an end portion of the display screen 110 among the plurality of areas, the at least one area being the visible light communication area.

With this configuration, by transmitting the visible light communication signal at the end part of the display screen 110, it is possible to prevent the display screen area on which the visible light communication signal is output from being noticeable, and to thereby reduce modifications such as a modification for making the display screen 110 brighter.

In this embodiment, the display device 100 may continuously output the visible light communication signal, or may output the visible light communication signal in at least one particular period. Here, when the visible light communication signal is output in the particular period, a device for generating a start and an end of the particular period may be provided. In this case, the visible light communication signal processing unit 170 and the backlight control unit 180 switches to control for transmitting the visible light communication signal upon receiving the signal for starting the particular period, and switches to control for performing normal backlight control upon receiving the signal for ending the particular period. Considering a rise caused by switching, it is good to use a switching element using, for example, a solid-state semiconductor element as the device or a mechanism.

In this embodiment, the display device 100 is configured to preferentially output the visible light communication signal on the area 111 corresponding to the uppermost part of the display screen 110 of the display device 100. However, the configuration is a non-limiting example.

For example, it is only necessary that the area on which the visible light communication signal is preferentially output is at least one of the areas on the display screen 110. The area for output may be an area wider than the area 111 when, for example, the communication accuracy of a signal is preferred, or may be a narrowest area in a minimum unit in the backlight scan when an image quality is preferred. Alternatively, areas including both end parts of the display screen 110 of the display device 100 may be used considering that a human tends to focus on a center part of the display screen 110.

In this embodiment, a description is given of a case where a single visible light communication signal is transmitted to one of the areas on the display screen 110. However, this case is a non-limiting example.

For example, it is possible to transmit a visible light communication signal in some (not all) of the areas on the display screen 110. Here, it is also possible to independently transmit visible light communication signals in non-consecutive areas. In this way, the display device 100 may include two or more circuits each for generating a modulation signal of a visible light communication signal, and the circuits may operate at the same time when the control circuit operates for backlight scan on the area on which each visible light communication signal is output.

In this embodiment, the single visible light communication area is set as a non-limiting example. Alternatively, it is possible to set one or more visible light communication areas, and to superimpose visible light communication signals on each visible light communication area. In this case, a video signal represents a video related to each visible light communication signal, and a video indicating that the visible light communication signal is currently being transmitted is displayed. In this way, it is possible to provide an advantageous effect of reducing the cases where users misrecognize that the image quality of the display image (video) on which no visible light communication signal is output, and to reduce the cases where a plurality of signals are handled or a user makes a mistake. As a video related to the visible light communication signal, a video obtainable when a highest-possible opening rate that enables obtainment of a signal S/N ratio, that is, a signal having a highest luminance representing a white color may be used. This makes it possible to significantly reduce communication errors of visible light communication signals. In this way, the display device 100 can indicate from which area of the display screen 110 the visible light communication signal is currently being transmitted, guide the receiver to the area which is the display area and to which the visible light communication signal is currently being transmitted. This leads to further increase in communication accuracy.

By performing the above control, it is possible to enhance image quality and increase communication accuracy.

The area on which the visible light communication signal is transmitted emits a constant amount of light as indicating the luminance thereof even in a blanking period, and thus a high brightness phenomenon occurs under a dark level display condition. Furthermore, an increase in the difference in the average luminance between adjacent areas may result in a video on which the boundary between the adjacent areas is noticeable.

To prevent this, it is also possible to further enhance image quality by performing control for changing the duty based on a video signal and/or the visible light communication signal which are described in the following variations.

Variation 1

In this variation, it is also good to perform control for changing (I) an area which is of a backlight 190 and corresponds to (i) a given area to which a visible light communication signal is currently being transmitted (for example, an area 111 in FIG. 2) or (ii) an area (for example, an area 112 in FIG. 2) adjacent to the given area and/or (II) a duty based on a video signal of the area of the backlight 190. Hereinafter, an example of a specific control for changing the duty based on the video signal and/or the visible light communication signal is described with reference to FIG. 6.

Figure 6:
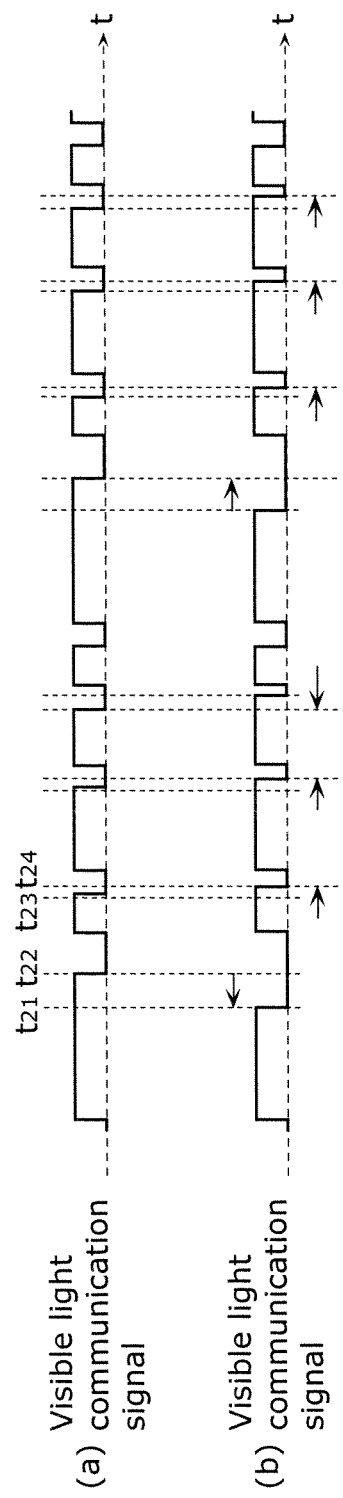
FIG. 6 is a schematic diagram for illustrating signal control according to Variation 1.

FIG. 6 is a schematic diagram for illustrating signal control according to Variation 1. In FIG. 6, (a) is a schematic diagram indicating a visible light communication signal before change of the duty of the visible light communication signal, and (b) is a schematic diagram indicating a state in which the duty of the visible light communication signal is changed.

More specifically, it is possible to change a High period of the pulse of a visible light communication signal (change the duty of the communication signal) by, for example, changing a time for a fall of the visible light communication signal illustrated in (a) of FIG. 6 from Time t22 to Time t21 that precedes Time t22 as illustrated in (b) of FIG. 6, or changing a time for a fall of the visible light communication signal illustrated in (a) of FIG. 6 from Time t23 to Time t24 that succeeds Time t22 as illustrated in (b) of FIG. 6.

In the case where the duty of the backlight by a video is larger than the duty of the visible light communication signal, it is also good to perform signal control for increasing an average duty in the area in which the visible light communication signal is transmitted and adjacent areas, instead of signal control for decreasing the duty of the average visible light communication signal in the area in which the visible light communication signal is transmitted. In the opposite case where the duty of the backlight based on the whole video signal is smaller than the duty of the visible light communication signal, in a power saving mode as backlight control, it is also good to perform signal control for decreasing an average duty in the area in which the visible light communication signal is transmitted.

[Summary of this Variation]

As described above, in this variation, the backlight control unit (180) may change (i) an average duty in the visible light communication area and/or (ii) a duty based on a video signal in each area adjacent to the visible light communication area and/or a visible light communication signal, according to the difference between the average duty in the visible light communication area and the duty based on the video signal in the area adjacent to the visible light communication area, in the period in which the visible light communication signal is output.

With this configuration, it is possible to reduce the difference in luminance (brightness) between the visible light communication area and the areas other than the visible light communication area.

In this way, it is possible to perform signal control for approximating to the luminance obtainable in a state where no visible light communication signal is transmitted, and to thereby further enhance the image quality, in addition to the enhanced image quality and the increased communication accuracy obtainable by control in Embodiment 1.

Here, the backlight control unit 180 may change the duty based on the video signal in the visible light communication area and/or the duty based on the visible light communication signal so as to approximate the average duty per frame corresponding to the visible light communication area to the average duty based on the video signal in the area adjacent to the visible light communication area.

In this way, in a blanking period in the case where no visible light communication signal is transmitted, it is possible to perform control for approximating the luminance to the luminance obtainable in the state where no visible light communication signal is transmitted by maintaining the duty of the video signal in the area adjacent to the area in which the visible light communication signal is transmitted and decreasing the average duty per frame corresponding to the area in which the visible light communication signal is transmitted.

In addition, in the period in which the visible light communication signal is output, the backlight control unit 180 may be configured to: perform luminescence control based on the visible light communication signal in the visible light communication area; and perform control for turning on or off light for each of the one or more areas other than the visible light communication area so as to reduce a difference between a luminance in the area which is on the display screen 110 and corresponds to the visible light communication area and a luminance in each of areas which are on the display screen 110 and correspond to the one or more areas other than the visible light communication area.

In this way, in a blanking period in the case where no visible light communication signal is transmitted, it is possible to perform control for increasing the average duty per frame in the area adjacent to the area in which the visible light communication signal is transmitted.

In addition, in the period in which the visible light communication signal is output, the backlight control unit 180 may be configured to: perform luminescence control based on the visible light communication signal in the visible light communication area; and perform control for each of the one or more areas other than the visible light communication area by respectively applying different currents to the one or more areas so as to reduce a difference between a luminance in the area corresponding to the visible light communication area and a luminance in each of areas corresponding to the one or more areas other than the visible light communication area.

In this way, it is possible to equalize the luminance levels by current control instead of duty control.

Variation 2

Figure 7:
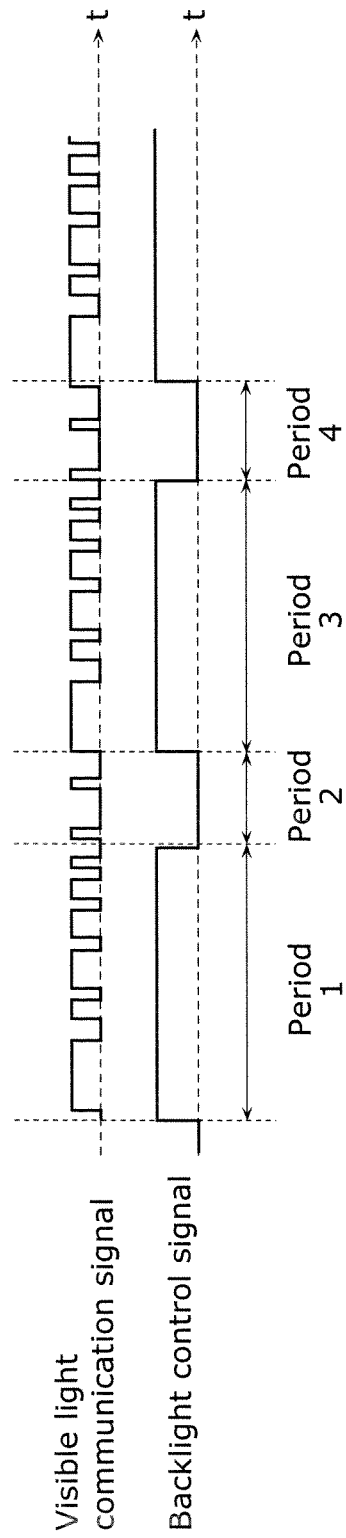
FIG. 7 is a schematic diagram for illustrating signal control according to Variation 2.

FIG. 7 is a schematic diagram for illustrating signal control according to Variation 2.

As illustrated in FIG. 7, in Period 1 and Period 3 in which a backlight control signal is ON, a visible light communication signal having a large duty is input to a corresponding one of the areas of the backlight 190, and in Period 2 and Period 4 in which a backlight control signal is OFF, a visible light communication signal having a small duty is input to a corresponding one of the areas of the backlight 190. With this control, it is also possible to change the duty in the visible light communication area.

[Summary of this Variation]

In this way, it is possible to perform signal control for approximating to the luminance obtainable in the state where no visible light communication signal is transmitted, and to thereby further enhance the image quality, in addition to the enhanced image quality and the increased communication accuracy obtainable by control in Embodiment 1.

Variation 3

Furthermore, it is also good to perform control for changing the duty of a visible light communication signal in the following manner.

First, it is assumed that a receiver side such as a smartphone 200 can directly receive an ON/OFF signal (High/Low signal) for each of slots periods (predetermined time periods) in which signals are periodically transmitted in certain periods, and that the slot periods are fixed and not changed. In this case, the receiver side detects only rises or falls of a pulse of the transmitted visible light communication signal, and determines correspondence between the detected rise and fall times and positions (temporal positions) as original slot time points. In this way, it is possible to determine each of the slots corresponds to an ON signal or an OFF signal.

Hereinafter, an example of a specific control performed in the display device 100 side to change the duty based on the video signal and/or the visible light communication signal is described with reference to FIG. 8.

Figure 8:
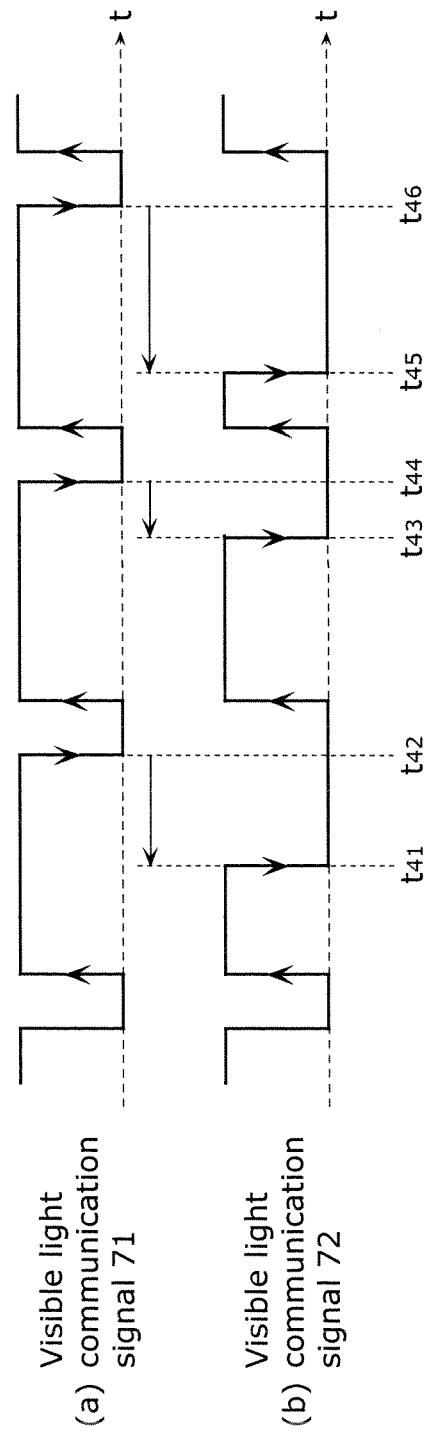
FIG. 8 is a schematic diagram for illustrating signal control according to Variation 3.

FIG. 8 is a schematic diagram for illustrating signal control according to Variation 3. In FIG. 8, (a) illustrates an example of the visible light communication signal 71 before a fall time of the visible light communication signal is changed, and (b) illustrates an example of the visible light communication signal 72 before a fall time of the visible light communication signal is changed.

For example, when the receiver side catches only rises of the pulse, the display device 100 may perform control, in the slot time period, for turning off the visible light communication signal 72 (changing it to an OFF signal) at a time point between Time t41, Time t43, Time t45, etc. in (b) of FIG. 8, instead of turning on the visible light communication signal 71 (changing it to an ON signal) at a time point between Time t42, Time t44, Time t46, etc. in (a) of FIG. 8. In this variation, as illustrated in FIG. 8, it is possible to make the off period of the visible light communication signal 71 longer than the off period of the visible light communication signal 72 by performing control for changing the fall time of the visible light communication signal 71 to an earlier time.

The above description has been made based on an example where the luminance control performed using PWM of the backlight 190 to realize a uniform image quality in the whole image and prevent an image quality from being decreased. However, the example is a non-limiting one. The backlight control unit 180 may approximate the luminance of the visible light communication area to the luminance of the areas other than the visible light communication area by controlling current to be supplied to the respective areas of the backlight 190. Furthermore, the backlight control unit 180 may approximate the luminance level of the visible light communication area to the luminance levels of the areas other than the visible light communication area by performing the PWM control of the backlight 190 and the current control in combination.

[Summary of this Variation]

As described above, in this variation, the backlight control unit 180 may be further configured to, in the period in which the visible light communication signal is output, change a high period of a pulse of the visible light communication signal so as to approximate a luminance in the visible light communication area to a luminance in each of one or more areas other than the visible light communication area.

Here, the backlight control unit 180 may be configured to change the high period of the pulse by changing a fall time or a rise time of the visible light communication signal.

In the period in which the visible light communication signal is output, the backlight control unit 180 may be further configured to change (i) an average duty in the visible light communication area and (ii) a duty in an area adjacent to the visible light communication area, according to a difference between the average duty in the visible light communication area and an average duty of an image signal in the area adjacent to the visible light communication area.

The backlight control unit 180 may be configured to change a duty in the visible light communication area by approximating the average duty in the visible light communication area to the average duty of the image signal in the area adjacent to the visible light communication area.

In this way, it is possible to decrease the duty throughout one field, and to make more natural changes when the ON rates of the adjacent areas are small.

In addition, also in a time zone that conventionally corresponds to a blanking period, it is possible to provide a video having an image quality close to the original image quality in the case where no visible light communication signal is transmitted by performing the control as described above.

When the receiver side catches only falls of a pulse in a time zone in which turn-on rates of the area in which a visible light communication signal is transmitted and the adjacent areas are extremely high, it is possible to increase the duty by changing the rise time to an earlier time in the manner opposite to the above case. In this way, it is possible to reduce the luminance difference between the adjacent areas.

The backlight control unit 180 may approximate the luminance of the visible light communication area to the luminance of the areas other than the visible light communication area by controlling current to be supplied to the respective areas of the backlight 190.

In this way, the control in this variation makes it possible to perform control for preventing the average luminance levels of the areas from dramatically changing. Furthermore, it is possible to provide a natural image with less discontinuous areas with control signals when seen as the whole image. According to the signal control method in this variation, it is possible to change the rise and fall times of a visible light communication signal to an earlier or later time, depending on whether a luminescence intensity of each adjacent area is higher or lower than a luminescence intensity of the visible light communication area, and to thereby reduce the luminance difference between the adjacent areas.

In order to realize the signal control in this variation, the following method may be used.

First, (i) the luminance level of a video of the area in which the visible light communication signal is transmitted and the luminance levels of videos of areas adjacent thereto and (ii) luminance levels obtainable through backlight scan and the visible light communication signal are calculated on a basis of a frame to be displayed on the display screen. Next, a whole-field average duty for avoiding unnatural discontinuity is calculated considering the difference between the adjacent areas, and average duty of a whole-field between the area to which the visible light communication signal is transmitted and the adjacent areas is determined. Next, time by which an on time is increased or decreased is calculated based on the single whole-field duty, and control is performed so that a signal forcibly rises to an ON state or falls to an OFF state as time goes by.

With the mechanism for realizing the method (operation), it is possible to provide a monitor for supplying a communication signal different from a video signal without reducing a signal transfer accuracy and without significantly damaging the image quality.

Other Embodiments

The above embodiment has been described as an example of a technique disclosed in the present application. The technique in the present disclosure is not limited to the embodiment, and is applicable to other embodiments obtainable by, for example, partly modifying, replacing, adding, or omitting the embodiment.

Hereinafter, other non-limiting embodiments are described.

For example, it is also good to further perform image signal superimposition, or perform the backlight scan in a different order. Hereinafter, exemplary operations of the other embodiments are described with reference to FIG. 9A and FIG. 9B.

Figure 9A:
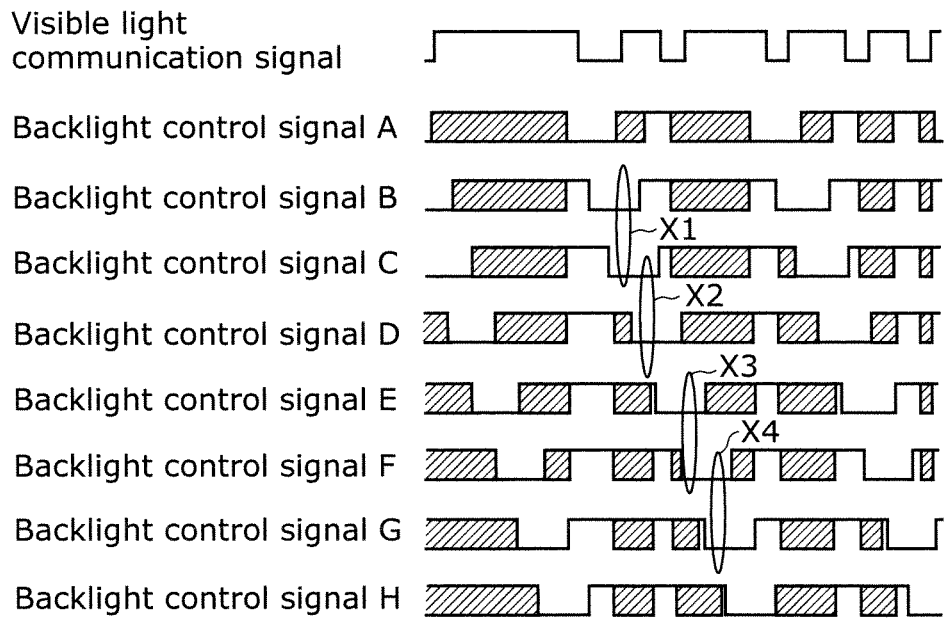
FIG. 9A is a schematic diagram illustrating an example of backlight control according to another embodiment.
Figure 9B:
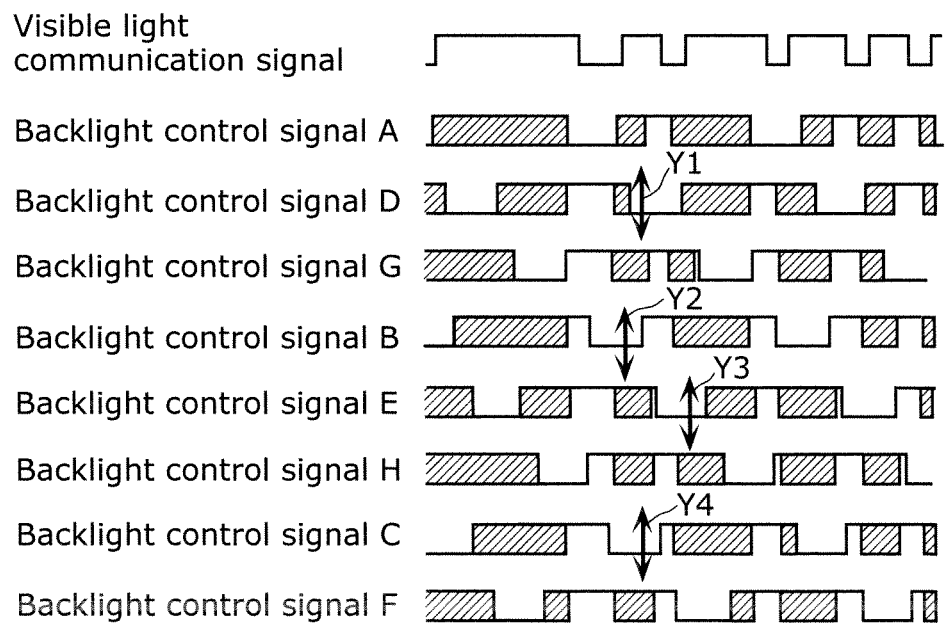
FIG. 9B is a schematic diagram illustrating an example of backlight control according to another embodiment.

FIG. 9A and FIG. 9B each are a schematic diagram illustrating an example of backlight control according to one of the other embodiments. FIG. 9A and FIG. 9B each illustrate a backlight scan method performed when a display screen is divided into eight areas. Backlight control signals A to H correspond to the eight areas.

Conventionally, in backlight scan, a useless time zone in writing of image data is divided into blocks, and control for turning off the backlight is performed in a time slot for contrast enhancement.

However, in reality, a considerable amount of light leaks from adjacent areas. For this reason, the light leaked from the adjacent areas can be used to complement a blanking period in backlight scan, but a problem occurs in this case.

More specifically, in a sequential scan, a visible light communication signal is lost when adjacent areas simultaneously transition to blanking periods as represented by the circled portions denoted with X1, X2, X3, and X4 in FIG. 9A. For this reason, as an example of the problem, associations with slot boundaries in the transfer of the visible light communication signal become unclear.

To prevent this, it is also good to perform control for modifying a scanning order of image data so that at least one of the adjacent areas always has an on-state backlight control signal without allowing the adjacent areas to transition to the blanking periods simultaneously, as represented by the arrows denoted as Y1, Y2, Y3, and Y4 in FIG. 9B. These methods are advantageous solely, and are also sufficiently advantageous when combined with the above embodiment.

Although each coded signal is described as one signal in the above embodiment, but it is also good to realize luminescence caused by a group of high frequency pulses of two or more sub-carrier waves in a single signal, in order to further reduce flickering when seen by a human.

As another embodiment, it is also good to change a duty ratio of a visible light communication signal as necessary. In a dark period caused by a sub-carriage wave, it is also good to transition to a luminescence state darker than in an on state, instead of transition to an off state.

In addition, as a feature of a general display, the display may have been subject to gamma correction with a value of 2.2 or, a value of 2.4 in the case of a digital broadcast signal. However, particularly in the case of superimposing the visible light communication signal in the above embodiment, it is also good to set the gamma correction value to a higher value that is approximately 2.4 to 2.8 so as to increase luminance in the middle of a grayscale. In this way, it is possible to provide an advantageous effect of decreasing transmission errors of visible light communication signals.

More specifically, as another embodiment, it is also good to control a gamma correction value automatically by an average picture level (APL) or as set in advance. Furthermore, when a video signal itself is very dark, and an error is likely to occur due to insufficient performance of a receiver side, it is also good to temporarily stop the signal. In consideration that a signal is transmitted in one-way communication irrespective of the nature of an image screen, it is also possible to provide an advantageous effect by transmitting the same signal twice or more as a countermeasure for preventing a reception error.

The above embodiment has been described as an example of a technique disclosed herein. For this purpose, the attached drawings and detailed descriptions have been provided.

Accordingly, the constituent elements illustrated in the attached drawing and described in the detailed descriptions include not only constituent elements that are essential to solve the problem but also constituent elements that are not essential to solve the problem. For this reason, it should not be directly asserted that the non-essential constituent elements are essential based on the fact that the non-essential constituent elements are illustrated in the attached drawing and are described in the detailed descriptions.

The above embodiment is provided as an example for illustrating the present disclosure, and thus various kinds of modification, replacement, addition, omission, etc. may be made in the scope of the Claims or the equivalents.

Since only an exemplary embodiment and variations thereof according to the present disclosure have been described in detail above, those skilled in the art will readily appreciate that many modifications are possible in the exemplary embodiment and variations thereof without materially departing from the novel teachings and advantages of the present disclosure. Accordingly, all such modifications are intended to be included within the scope of the present disclosure.

INDUSTRIAL APPLICABILITY

The present disclosure provides a display device capable of outputting visible light communication signals without significantly damaging the image quality of images to be displayed and reducing reception errors of the output visible light communication signals. More specifically, the display device according to the present disclosure is capable of obtaining information other than images safely and actively, and thus is applicable to (i) various kinds of devices such as television receivers, PCs, and tablets for home use, and particularly to (ii) digital signage, information terminals, information display devices performed or used away from home. When the display device according to the present disclosure is applicable to such (i) various kinds of devices for home use and (ii) digital signage and devices performed or used away from home, the resulting applications can be utilized in various scenes, i.e. either at home or even away from home, in which information items with or without images are received or transmitted. This is because any of the applications allows a user to receive or transmit information items as necessary safely and actively, etc.

The invention claimed is:

1. A display device which outputs a visible light communication signal, the display device comprising:
   a display panel including a display screen on which an image is displayed;
   a display control unit configured to cause the display panel to display the image on the display screen of the display panel, based on an image signal;
   a backlight having a luminescence surface which illuminates the display screen of the display panel from behind the display screen; and
   a backlight control unit configured to divide the luminescence surface of the backlight into a plurality of areas, and, based on the image signal, (i) perform luminescence control in each of the plurality of areas and (ii) set off periods starting at different times for the plurality of areas,
   wherein the backlight control unit is configured to:
   perform luminescence control in a visible light communication area which is at least one area among the plurality of areas in a period in which the visible light communication signal is output, based on the visible light communication signal, instead of performing luminescence control based on the image signal;
   perform the luminescence control based on the image signal, in the visible light communication area, in a period in which the visible light communication signal is not output, and
   (i) in the period in which the visible light communication signal is output, the backlight control unit sequentially performs luminescence control in the plurality of areas by replacing, with the visible light communication signal, at least one of back light control signals corresponding respectively to the plurality of areas; and (ii) in the period in which the visible light communication signal is not output, the backlight control unit sequentially performs luminescence control in the plurality of areas by using the back light control signals based only on video signals.

2. The display device according to claim 1, wherein the display control unit is configured to cause, based on the image signal, the display panel to display an image on areas which are of the display screen and correspond to (i) the visible light communication area and (ii) one or more areas other than the visible light communication area.

3. The display device according to claim 1, wherein, in the period in which the visible light communication signal is output, the display control unit is configured to cause the display panel to display an image in an area corresponding to the visible light communication area on the display screen, the image having a luminance higher than a luminance resulting when the image is displayed based on the image signal.

4. The display device according to claim 1, wherein, in the period in which the visible light communication signal is output, the display control unit is configured to cause the display panel to display an image in an area corresponding to the visible light communication area on the display screen, the image having a luminance lower than a luminance resulting when the image is displayed based on the image signal.

5. The display device according to claim 1, wherein, in the period in which the visible light communication signal is output, the backlight control unit is configured to perform luminescence control based on the visible light communication signal on at least one area corresponding to an end portion of the display screen among the plurality of areas, the at least one area being the visible light communication area.

6. The display device according to claim 1,
   wherein, in the period in which the visible light communication signal is output, the backlight control unit is configured to:
   perform luminescence control based on the visible light communication signal in the visible light communication area; and
   perform control for turning on or off light for each of the one or more areas other than the visible light communication area so as to reduce a difference between a luminance in the area which is on the display screen and corresponds to the visible light communication area and a luminance in each of areas which are on the display screen and correspond to the one or more areas other than the visible light communication area.

7. The display device according to claim 1,
   wherein, in the period in which the visible light communication signal is output, the backlight control unit is configured to:
   perform luminescence control based on the visible light communication signal in the visible light communication area; and
   perform control for each of the one or more areas other than the visible light communication area by respectively applying different currents to the one or more areas so as to reduce a difference between a luminance in the area corresponding to the visible light communication area and a luminance in each of areas corresponding to the one or more areas other than the visible light communication area.

8. The display device according to claim 1, wherein the backlight control unit is further configured to, in the period in which the visible light communication signal is output, change a high period of a pulse of the visible light communication signal so as to approximate a luminance in the visible light communication area to a luminance in each of one or more areas other than the visible light communication area.

9. The display device according to claim 8, wherein the backlight control unit is configured to change the high period of the pulse by changing a fall time or a rise time of the visible light communication signal.

10. The display device according to claim 1, wherein, in the period in which the visible light communication signal is output, the backlight control unit is further configured to change (i) an average duty in the visible light communication area and (ii) a duty in an area adjacent to the visible light communication area, according to a difference between the average duty in the visible light communication area and an average duty of an image signal in the area adjacent to the visible light communication area.

11. The display device according to claim 10, wherein the backlight control unit is configured to change a duty in the visible light communication area by approximating the average duty in the visible light communication area to the average duty of the image signal in the area adjacent to the visible light communication area.

* * * * *